No. 867,351. PATENTED OCT. 1, 1907.
J. L. DOELP.
NUT LOCK.
APPLICATION FILED JAN. 25, 1907.
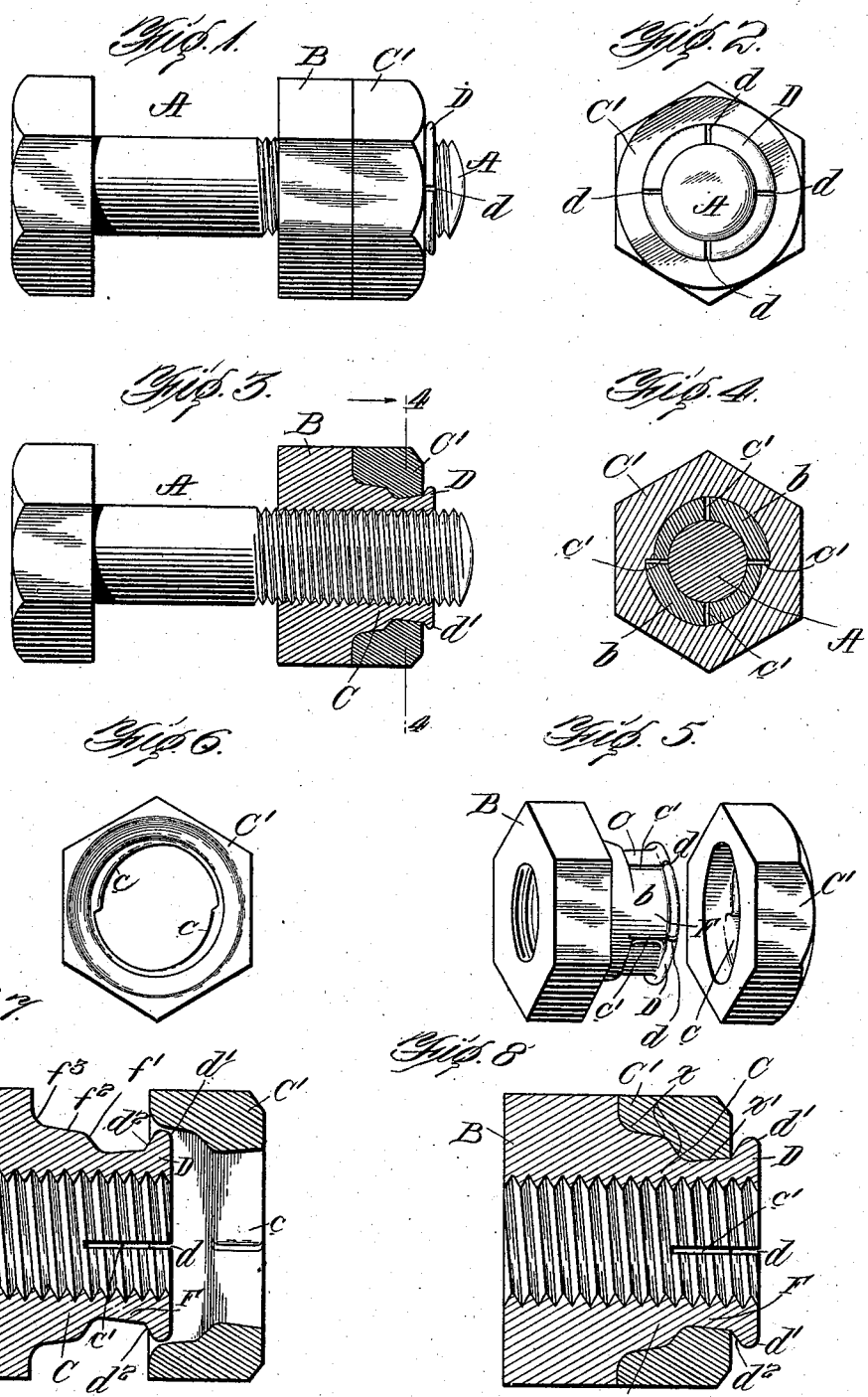
Witnesses:
Paul J. Gathmann
M. Lilian Adams.
Inventor:
John L. Doelp.
By his Attorneys:
Baldwin Wight.

UNITED STATES PATENT OFFICE.

JOHN L. DOELP, OF CINCINNATI, OHIO.

NUT-LOCK.

No. 867,351.  Specification of Letters Patent.  Patented Oct. 1, 1907.

Application filed January 25, 1907. Serial No. 354,090.

*To all whom it may concern:*

Be it known that I, JOHN L. DOELP, a citizen of the United States of America, residing in Cincinnati, in the county of Hamilton and State of Ohio, have invented certain new and useful Improvements in Nut-Locks, of which the following is a specification.

This invention relates to that class of nut locks in which the nut is provided with a split sleeve that receives a clamping ring which compresses the sleeve, causing it to bind on the bolt and thus prevent the nut from working loose.

My U. S. Patent No. 659,215, of Oct. 9, 1900, shows a nut lock of this class in which the split sleeve is formed with a cam surface on its periphery and the ring is provided with a corresponding cam surface which engages the surface of the sleeve. In my patented device, the sleeve is formed on its outer end with a flange for preventing endwise movement of the ring.

The object of my present invention is to improve the nut lock shown in my patent above mentioned. In said patented device, the flange on the end of the sleeve was made quite narrow and while its outer face was inclined or curved, its inner face was straight, producing a sharp annular outer edge which I found was often broken in the act of assembling the ring and sleeve. I also found that sometimes the ring, instead of passing entirely over the flange, would press a portion thereof inwards and retain it in this position, thus distorting the bore of the sleeve and making it impossible to screw the nut on to the bolt. This, of course, was not always the case, but it sometimes happened. By my present improvements, I so form said flange that there is no liability of the objections above referred to. In the nut lock shown in my prior patent, I formed the inner end of the ring with a recess which was such that when the ring and sleeve were assembled, the ring was out of engagement with the sleeve for about half of its length. In my improved nut lock, the arrangements are such that the ring is in engagement with the sleeve throughout its entire length.

In the accompanying drawings:—Figure 1 shows a side elevation of a bolt and nut with my improvements applied. Fig. 2 shows an end elevation thereof. Fig. 3 shows a side elevation of a bolt and a section of the nut with its locking devices applied to the bolt. Fig. 4 shows a transverse section through the nut locking devices on the line 4—4 of Fig. 3, looking in the direction of the arrow. Fig. 5 is a perspective view of the nut and its locking devices. Fig. 6 is an inner end view of the locking ring. Figs. 7 and 8 are views on an enlarged scale and in central, vertical section showing the manner in which the ring is applied to the sleeve.

The bolt, A, it will be observed, is of ordinary form. Its screw-threaded portion may be straight or tapered, but is preferably made straight as shown. My improvements do not depend on any special construction of bolt, but may be readily applied to any bolt. The nut, B, is formed with a sleeve, C, which projects from one face and is threaded on its inner surface similarly to the nut. On its periphery, the sleeve is formed with one or more spiral cam surfaces, $b$, i. e., a surface of gradually increasing radius to operate in connection with a corresponding surface, $c$, on the interior of the ring, C', which surrounds the sleeve at its outer end. The sleeve is split so that it may be collapsed and grip the bolt when the ring is turned in one direction and to expand when the ring is turned to another position. In the drawings, the sleeve is shown as being split or slotted at 4 places, $c'$, but a less or greater number of slits may be employed.

In order to prevent the ring from slipping off endwise when loose on the sleeve, I provide a stop, D, which projects from the sleeve across the end of the ring. I have shown this stop as being in the form of a flange formed integrally with the sleeve and extending entirely around it, being interrupted only by the slits, $d$, formed in it, which are in a line with and form continuations of the slits, $c'$. The flange, D, is rounded on its periphery, presenting a curved outer edge at $d'$, while the inner wall of the flange has a decided incline as indicated at $d^2$. At F, just inside the flange, the cam bearing surfaces are formed and in rear of this there is an inclined wall, $f'$, joining an annular raised portion, $f^2$, which, by a concaved wall, $f^3$, joins the front face of the nut, B. The ring, C', is formed with a wall, $x$, which corresponds in form with the surfaces, $f'$, $f^2$, $f^3$, and the front wall of the nut, B, while at $x'$, the cam surfaces corresponding with the cam surfaces on the sleeve are produced. The construction is such that the ring may be driven on to the sleeve and when driven on will closely fit it.

The manner in which the ring and sleeve are assembled is illustrated in Figs. 5, 7 and 8. Normally the sleeve is expanded, but when the ring is placed axially in line with it and is driven towards the nut, the sleeve will be compressed to such an extent that the ring passes entirely over the flange, D, after which the sections of the sleeve expand and the flange assumes the position shown in Fig. 8, at which time the ring is free to turn on the sleeve, but is prevented from endwise movement thereon.

It will be understood that the ring is applied to the sleeve before the nut is applied to the bolt and when in use the nut carries the ring with it until the proper adjustment is obtained. Then the ring may be turned in such manner as to compress the sleeve and cause it to grip tightly the bolt thus securely locking the nut in place.

It will be observed that the nut and the ring are of practically the same shape and the same wrench or tool may be used for turning them.

While the ring securely locks the nut in place when desired, it may also be readily turned to cause the sleeve to release its grip on the bolt and then the nut may be withdrawn, but the ring cannot be separated from the nut.

By inspection of Figs. 7 and 8, my present improvements will be more readily perceived. Fig. 7 shows the parts in the position they are placed just before the ring is driven on to the sleeve. It will be observed that the surfaces of the sleeve and ring are so inclined that when the ring is driven towards the nut the former can easily pass over the flange, D, compressing the sections of the sleeve in so doing and after having passed over the periphery of the flange, the ring will assume the position shown in Fig. 8, its outer edge around its bore sliding down the inclined surface, $d^2$. I have found in practice that by thus constructing the parts, there is no possibility of one section of the sleeve being compressed more than another, but that there is a uniform compression at all times and an immediate uniform expansion after the ring has passed the flange. The inner wall, of the ring fits closely the corresponding wall on the sleeve and nut, thus producing a solid structure as shown in Fig. 8 and producing a long, gripping action on the bolt.

I claim as my invention:—

1. The combination of a nut formed with a split sleeve having a cam surface on its periphery, a ring surrounding the sleeve formed on its interior with a corresponding cam surface engaging that on the sleeve and a stop-flange on the outer end of the sleeve having an inclined inner wall, down which the outer edge of the wall of the hole in the ring slides when the latter is forced over the sleeve.

2. The combination of a nut formed with a split sleeve having a cam surface on its periphery and a ring surrounding the sleeve formed on its interior with a corresponding cam surface engaging that on the sleeve and a flange on the outer end of the sleeve formed with a curved periphery and an inclined inner wall down which the outer edge of the wall of the hole in the ring slides when the latter is forced over the sleeve.

3. The combination of a nut formed with a split sleeve having a cam surface on its periphery and raised rear walls, a flange at the outer end of the sleeve having an inclined inner wall and a ring surrounding the sleeve formed on its interior with a cam surface engaging that on the sleeve and formed also with an inner surface fitting the raised surface at the rear end of the sleeve the arrangement being such that as the ring is forced on to the sleeve, the outer edge of the wall of the hole in the ring slides down the inclined surface of the flange and causes the inner surface of the ring to fit closely on the sleeve whereby a solid and rigid structure is produced.

In testimony whereof, I have hereunto subscribed my name.

JOHN L. DOELP.

Witnesses:
LLOYD B. WIGHT,
C. M. FORREST.